This invention relates to a new and improved structural material of high strength composed of two or more elements present in a diphase or polyphase system in which one of the phases exists in the structure in the form of fibers or other stretched or elongated substance. It relates more particularly to a composite structure of the type described and to a method for the manufacture of same wherein the fibrous phase is formed preferably of a glass while one of the other materials is a metal present in the form of fibers but preferably as a matrix or a continuous phase in which the fibers of glass are uniformly distributed for reinforcement and/or modification of the properties of the metal and in the manufacture of high strength structural materials and products.

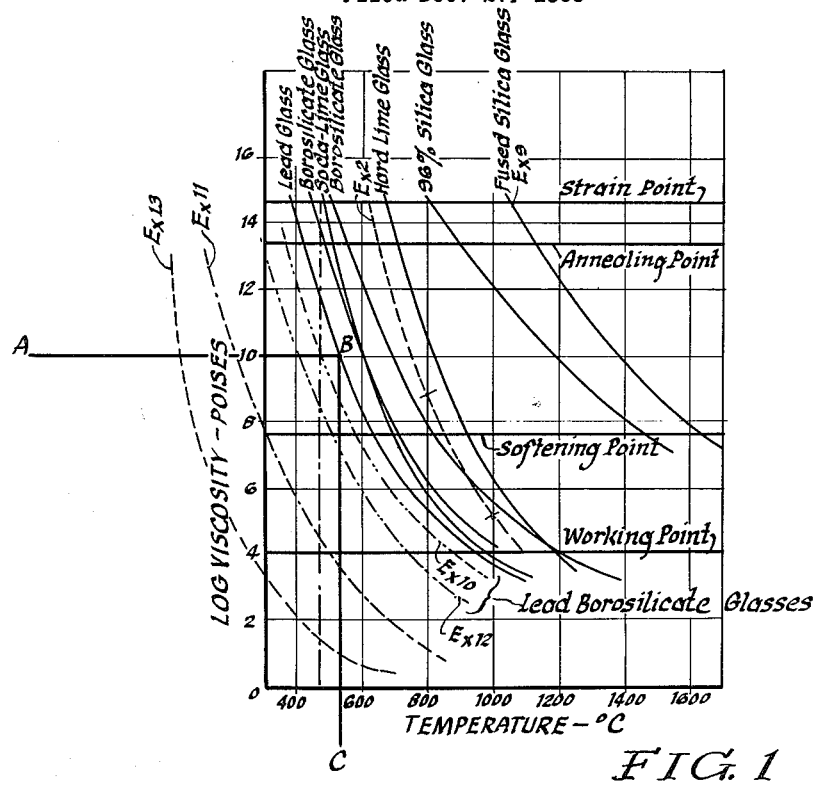
FIG. 1
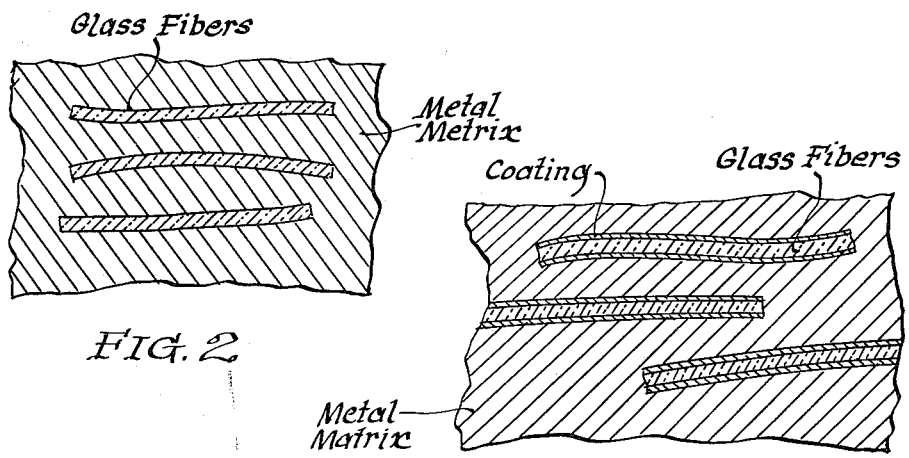
FIG. 2
FIG. 3
INVENTOR.
Games Slayter
BY
Staelin and Overman
Attorneys 3,047,383
POLYPHASE MATERIALS
Games Slayter, Newark, Ohio, assignor to Owens-Corning Fiberglas Corporation, a corporation of Delaware
Filed Dec. 27, 1955, Ser. No. 555,528
1 Claim. (Cl. 75—201)

This invention is a continuation-in-part of my copending application Ser. No. 219,111, filed October 3, 1951, and entitled "Polyphase Materials," now abandoned.

In the aforementioned parent application, description is made of a heterogeneous system in which the fibrous phase is formed of a material such as glass, ceramic, refractory, metal, synthetic organic or synthetic organic-inorganic polymer and the like, and in which the other phase or phases in the form of a fibrous phase, matrix and the like is composed of a material such as glass, ceramic, refractory, metal, synthetic organic or inorganic resin and the like in which the aforementioned fibrous phase is preferably uniformly distributed and in which the phases are incapable of complete interdiffusion one with the other so as to maintain their separate identity in the structure. Obviously the system is capable of many ramifications such as glass fibers in a glass matrix, glass fibers in a ceramic matrix, glass in refractory, glass in metal, metal in glass, metal in ceramic, metal in refractory, metal in metal, resin in resin, and the like wherein the first component named comprises the fibrous phase in combination with the other component in the heterogeneous system.

The intent is to make use of a fibrous phase having higher strengths, elasticity, inertness, insulation characteristics or the like for modification of the characteristics of the other phase or phases in the manufacture of new and improved products, even when the fibrous phase is present in relatively small amounts as compared to the other phase or phases but in amounts sufficient to improve the tensile strength, flexure strength, impact strength, elongation, elasticity, creep or other mechanical and physical properties of the materials without materially affecting the other desirable properties thereof.

This invention is addressed to the system which makes use of a glass as the fibrous phase and a metal or metals as the other phase or phases which may be either in a fibrous form but preferably in the form of a matrix or substantially continuous phase in which the fibers of glass are uniformly distributed.

It is an object of this invention to produce and to provide a method for producing a composite structure of the type described having a fibrous phase formed essentially of a glass in combination with a phase or phases formed of a metal and it is a related object to produce a composite structure of the type described in which, in the glass and metal system, a relatively strong bonding relationship is developed at the interface between the metal and glass to maximize the physical and mechanical properties available from the glass inclusions in the composite structure that is formed.

These and other objects and advantages of this invention will hereinafter appear and for purposes of illustration, but not of limitation, embodiments of the invention are illustrated in the accompanying drawing in which:

FIGURE 1 is a curve showing the viscosity characteristics of various glasses which may be used in the practice of this invention;

FIGURE 2 is an enlarged sectional elevational view through a section of a composite structure manufactured in accordance with the practice of this invention; and FIGURE 3 is a sectional elevational view similar to that of FIGURE 2 showing a modification in the structure produced herein.

Many of the metals available commercially are limited in applications because of the inability of the particular metal to meet certain specifications for use, such as strength, creep and other mechanical or physical properties, or because the metal is incapable of being processed by methods which would enable the particular metal to be competitive price-wise with other metals or materials which might be less desirable for the particular application from the standpoint of its physical and mechanical requirements.

It has been found in accordance with the practice of this invention that many such deficiencies or incapabilities of a metal can be overcome by the combination to include a fibrous phase of glass in the metal. It has been found further that a metal, satisfactory for many uses in its present form, can be so improved in its mechanical and physical properties by the practice of this invention to incorporate a fibrous phase of glass that it is capable of greatly expanded uses into applications and fields heretofore foreclosed to the metal and that products in which the new fibrous metal combination is employed are improved by comparison with the products formed of the metal alone.

For example, because of its low specific gravity, aluminum finds many applications in various fields. Nevertheless, there are many applications where it would be desirable to make use of aluminum but because of the low strength properties of aluminum, especially at elevated temperatures, it is necessary to sacrifice weight and make use of other materials of higher specific gravity than aluminum and which usually are also more expensive.

In this particular relationship, it has been found that the combination of glass fibers with aluminum is effective markedly to increase the strength properties of aluminum to the extent that the glass fiber reinforced aluminum products can be used effectively in applications in aircraft where materials of higher strengths were heretofore required.

In addition to the increase in the tensile strength and flexure strength properties of the material, the presence of glass fibers tends to stabilize the metal against creep and against deformation or change in shape during use. These are but a few of the important contributions which the glass fibers make in systems of the type produced in accordance with the practice of this invention.

Further, because of the inertness and waterproofness of lead, use has been made of lead as a sheath for cables in the communications and electrical fields. Because of the high specific gravity of lead and because of its low tensile strength, it has been necessary to reinforce the lead with strands or wires of steel. These are expensive and subject to deterioration or attack with the result that the cost of the lead-sheathed cable is increased while its suitability for the application is of necessity decreased. In accordance with the practice of this invention, it has been found that glass fibers may be incorporated to increase the tensile strength properties of lead without increasing the cost of the finished product and while also increasing its inertness and resistance to attack by elements normally existing in the atmosphere or underground. A similar situation exists in the use of aluminum strands for electrical cables wherein a steel core has been required in the past to supply the additional strength necessary for support.

Using lead further as representative, in addition to its low tensile strength, lead is subject to creep which prevents its use where permanent shape or dimension constitute important specifications, even where its strength might be sufficient. For example, the use of lead as a lining for tanks and conduits in which corrosive materials are stored is faced by the problem of deformation of the lead under load. As a result, it has been necessary to "shore up" the lead walls to minimize deformation in use. The combination described and claimed herein of glass fibers with lead obviates the tendency for the lead to creep and at the same time the glass fibers increase the strength of the lead with the result that a lead base material of the type produced by this invention may be used for lining conduits and tubing without the additional supports heretofore required and with further improvements in the characteristics of the lining or insulation.

Aside from the physical and mechanical properties of metals previously considered, many metals are limited in their applications and use because of the inability to make use of efficient and economical methods for the fabrication of parts therefrom, as by means of extrusion and die-casting, to compete price-wise with products formed of other and possibly even less desirable metals. For example, many metals of low melting points and low viscosity in molten condition cannot be handled economically for fabrication into products by such low cost methods as extrusion, die-casting and the like. As a result, parts formed from such materials by other more expensive methods are not able to compete price-wise with products extruded or die-cast from other metals. Again, it has been found that the characteristics of such metals in fluid condition may be desirably improved by the practice of this invention by the inclusion of glass in fibrous form to broaden the processing characteristics of the metal while simultaneously introducing other improvements in mechanical and physical properties, as previously described.

In addition to the foregoing, the combination of glass fibers with a metal provides for further improvements in the characteristics of the metal, such as increased impact strength, increased resistance to corrosion and attack, reduced heat conductivity, improved electrical insulation properties and increased elasticity.

The concepts described and claimed in this application may be illustrated generally by FIGURE 2 of the drawing wherein 10 represents glass fibers uniformly distributed within a matrix 12 of a metal. It will be apparent that the structure illustrated is susceptible of a great many variations by way of the materials of which it is formed, and also from the standpoint of the procedure in fabrication of the structure.

For example, the matrix may be formed of any desirable metal capable of meeting the specifications which will hereinafter be described, such as aluminum, lead, copper, tin, zinc, cobalt, bismuth, titanium, iron, nickel, chromium, molybdenum, zirconium, magnesium, silver and the like, or alloy metals such as "Wood's metal," steels, brass, bronze and the like. Use may be made of a combination of metals or alloys, as illustrated in FIGURE 3 of the drawing wherein one metal 14 is employed as a separate layer on the glass fiber 16 for use as an anchoring agent to increase the bonding relationship between the glass fiber 16 and the metal of the matrix 18 in which the glass fibers are distributed or in which use may be made of a combination of glasses, in which the glass forming the core of the fibers is modified by a coating of another glass for purposes of improving the anchorage relationship between the glass fibers and the metal in which it is introduced.

As used herein, the term "glass fibers" is intended to include fibers such as are formed by attenuation of molten streams of glass issuing in continuous streams from the underside of a glass melting furnace by impact with such materials as high velocity streams of air, steam or other gases issuing at high velocity into angular engagement with the streams of glass. Such fibers are generally referred to in the field as discontinuous or glass wool fibers. Included also are fibers such as are formed by the rapid attenuation of streams of molten glass issuing from the furnace by winding the fibers at high speed, as they are formed, about a spindle for rapid attenuation of the streams into fine filaments, generally referred to as continuous fibers. Included also are strands and yarns formed of such continuous or discontinuous fibers and fabrics formed thereof. Other siliceous fibers such as rock wool fibers, slag wool fibers and asbestos fibers can be included but they are relatively weak by comparison with fibers formed of conventional glasses. Glass of various compositions can be used in the fabrication of fibers which may be employed in the practice of this invention. These range from the high softening point refractory fibers formed of substantially pure silica or quartz, through the fibers of intermediate softening point such as are formed of the sodium aluminum silicate glasses down to the low softening point glasses of lead borate and the like. The following are representative of the compositions of various types of glasses with their corresponding softening points and the viscosity characteristics of some are set forth in the curves of FIGURE 1 of the drawing.

EXAMPLE 1

Low-alkali, lime-alumino borosilicate:

| | Percent by weight |
|---|---|
| $SiO_2$ | 54.5 |
| $Al_2O_3$ | 14.5 |
| CaO | 22.0 |
| $B_2O_3$ | 8.5 |
| $Na_2O$ | 0.5 |

Softening point 1526° F.

EXAMPLE 2

Soda lime borosilicate:

| | |
|---|---|
| $SiO_2$ | 65.0 |
| $Al_2O_3$ | 4.0 |
| CaO | 14.0 |
| MgO | 3.0 |
| $B_2O_3$ | 5.5 |
| $Na_2O$ | 8.0 |
| $K_2O$ | 0.5 |

Softening point 1382° F.

EXAMPLE 3

Soda lime borosilicate:

| | |
|---|---|
| $SiO_2$ | 59.0 |
| $Al_2O_3$ | 4.5 |
| CaO | 16.0 |
| MgO | 5.5 |
| $B_2O_3$ | 3.5 |
| $Na_2O$ | 11.0 |
| $K_2O$ | 0.5 |

Softening point 1319° F.

EXAMPLE 4

Soda lime:

| | |
|---|---|
| $SiO_2$ | 73.0 |
| $Al_2O_3$ | 2.0 |
| CaO | 5.5 |
| MgO | 3.5 |
| $Na_2O$ | 16.0 |

Softening point 1310° F.

EXAMPLE 5

Lime-free soda borosilicate:
- $SiO_2$ _____ 59.5
- $Al_2O_3$ _____ 5.0
- $B_2O_3$ _____ 7.0
- $Na_2O$ _____ 14.5
- $ZrO_2$ _____ 4.0
- $TiO_2$ _____ 8.0
- $F_2$ _____ 2.0

Softening point 1247° F.

EXAMPLE 6

High lead silicate:
- $SiO_2$ _____ 34.0
- $Al_2O_3$ _____ 3.0
- $Na_2O$ _____ 0.5
- $K_2O$ _____ 3.5
- $PbO$ _____ 59.0

Softening point about 1110° F.

EXAMPLE 7

Pyrex type:
- $SiO_2$ _____ 81.0
- $Al_2O_3$ _____ 2.0
- $B_2O_3$ _____ 12.0
- $Na_2O$ _____ 4.5

Softening point about 1526° F.

EXAMPLE 8

Fiberfrax:
- $SiO_2$ _____ 45.77
- $Al_2O_3$ _____ 52.67
- $B_2O_3$ _____ 1.06
- $Na_2O$ _____ 0.5

Softening point over 2550° F.

EXAMPLE 9

Silica glass:
- $SiO_2$ _____ 100.0

Softening point 3130° F.

EXAMPLE 10

Lead borosilicate:
- $SiO_2$ _____ 24.6
- $CaO$ _____ 3.8
- $B_2O_3$ _____ 22.5
- $Na_2O$ _____ 10.0
- $CaF_2$ _____ 4.5
- $Na_3AlF_6$ _____ 9.1
- $PbO$ _____ 14.7

EXAMPLE 11

$B_2O_3$ type glass:
- $B_2O_3$ _____ 60.0
- $CaO$ _____ 10.0
- $Na_2O$ _____ 20.0
- $SiO_2$ _____ 10.0

EXAMPLE 12

Lead borosilicate:
- $SiO_2$ _____ 27.3
- $Al_2O_3$ _____ 8.7
- $CaO$ _____ 4.2
- $B_2O_3$ _____ 9.1
- $Na_2O$ _____ 13.0
- $ZnO$ _____ 11.4
- $BaO$ _____ 3.6
- $PbO$ _____ 17.6
- $F$ _____ 5.1

EXAMPLE 13

Lead borate:
- $SiO_2$ _____ 5.0
- $B_2O_3$ _____ 10.0
- $PbO$ _____ 85.0

While it is possible in the specification of materials to select a suitable metal by reference to its melting point, it is not practical to ascribe a melting point to a glass composition since the glasses merely soften and become less viscous as the temperature is increased. Thus use is made of a point on the viscosity curve for the glass composition which is referred to as the softening point in the selection of particular glasses herein. By the term "softening point" as used herein and in the trade is meant the temperature at which a uniform fiber 0.5 to 1.0 mm. in diameter and 22.9 cm. in length elongates under its own weight at a rate of 1 mm. per minute when the upper 10 cm. of its length is heated in a prescribed furnace at the rate of approximately 5° C. per minute. For a glass having a density near 2.5, this temperature corresponds to a viscosity of $10^{7.6}$ poises. At temperatures above this, the softening increases and the glass becomes increasingly plastic—it being common to plastically work glass in a viscosity range of $10^{7.6}$ poises to $10^4$ or at even a more fluid condition. Slow plastic extension could be carried out at viscosities somewhat higher than the above arbitrarily defined softening point.

In the description which will hereinafter be made of the various concepts capable of being employed in the practice of this invention, the specification or characteristics required of the glass and the metal for use in combination will be set forth to enable selection of a glass composition having the desired characteristics for use with a particular metal in a particular system to be employed. Use can be made of the list of glasses previously set forth as a guide, or a glass composition capable of meeting the specifications for use in the preparation of glass fibers can selected from the various treatises and tables available in the art. The properties of the many known metals and alloys are sufficiently clearly set forth in the various handbooks or tables to enable selection of a metal or metals meeting the defined specifications for use with the particular glass in the particular application.

The products illustrated generally in FIGURES 2 and 3 of the drawing are capable of being produced by the various techniques within the confines of this invention, which may be outlined broadly as follows:

(1) The desired metal or metal combination may be combined with the glass fibers for admixture therewith and forming into the desired end product by variations of powder metallurgy techniques to combine the glass and metal under heat and/or pressure into a composite structure, with or without the use of an additional binder metal.

(2) Glass fibers having a softening point above the molten working temperature of the metal can be included directly into the molten metal for admixture therewith prior to forming and setting, as by the processes of die-casting, mold-casting, hot pressing, extrusion and the like.

(3) Glasses having a sufficiently low viscosity to be workable or extensible or plastic within the working range of the metal can be incorporated in the form of a fiber or as particles with the metal which, upon working as by forging, rolling, drawing, die-casting, extrusion and the like, attenuates the glass particles into what will hereinafter be referred to as fibers as the metal is worked. In the described procedure, the particles of glass can be combined with the metal in powder or particle form for extension into fibers as the metal is worked into the desired end product.

(4) If the glass is freely flowable at the molten working temperature for the metal then the glass may be added in the desired amount to the metal whereby the glass can be strung out into fibers upon stirring of the metal or as the metal is poured into molds and the like. Instead of adding the glass in the molten state to the molten metal prior to pouring, the streams of glass may be introduced into the stream of metal for attenuation with the metal being poured. Thus a lead borate glass may be employed with molten aluminum.

In practically every one of these processes use is made of elevated temperature for reduction of either the metal or the glass or both to a flowable or plastic condition. In many such processes wherein the glass fibers are reheated subsequent to formation, as in the processes wherein the glass fibers are processed with the metal by the techniques of powder metallurgy or wherein the glass fibers are combined with the metal in flowable condition, it is important to take into consideration the limitations of the glass under the temperature conditions employed. With glass fibers, as with fibers formed with resinous filaments, strength properties are maximized by freezing the glass or resin while under tension in the longitudinal direction. Since glass fibers have tremendous surface areas per unit weight, it becomes possible to freeze the glass fibers in an expanded structure state by rapid cooling during attenuation in forming and by rapid cooling to freeze the metal during attenuation of the metal in forming as by the processes 3 and 4. Corresponding results are incapable of being developed in large masses of glass where the surface area is relatively low per unit area. Thus glass fibers are capable of being developed which enjoy exceptionally high strengths and which add to their utility as a reinforcement in the various materials.

Return toward the relaxed state by heating, such as finds its corollary in the annealing of metal, has noticeable effect upon the strength properties of glass. Thus the strength properties of the glass fibers in the product that is formed depend greatly on the elements present including the composition of the glass and metal and the conditions of time and temperature employed in the heat treatment for producing the desired end product.

Where the glass is introduced as fibers as an inclusion with the metal and where such fibrous state is maintained in the formation of the heterogeneous product, it is important to maintain a temperature condition which is below that sufficient to cause devitrification of the glass and, more important, the temperature should be maintained below the fusion temperature for the glass composition of which the fibers are formed. When it is desirable for the glass fibers to retain a great proportion of their strength properties, the glass fibers should not be exposed to a temperature above about 750° F. for any considerable time while the exposure time may be increased markedly at lower temperatures without materially affecting the desirable characteristics of the glass fibers. For example, with a lime, alumino, borosilicate glass of the type generally employed in the manufacture of glass fibers, exposure to temperatures within the range of 1000–1200° F. for a few seconds up to about 15–30 seconds is possible while exposures of several minutes up to a number of hours at temperatures below 750° F. can be made without serious effect on the strength properties of the glass.

Where, under the conditions of manufacture, the temperature conditions existing are below the softening temperature for the glass composition, the glass fibers can be incorporated directly as a fibrous phase for inclusion with the metal. When incorporated as a fibrous phase, the glass fibers may be selected of glass fibers previously formed, such as glass wool fibers, continuous filaments or strands of endless lengths preferably cut to shorter lengths, but it is preferred to make use of glass fibers fed directly from the fiber forming process or to make use of fibers which have been subjected previously to a heat treating process to take advantage of the improved bonding relationship which is available from the use of nascent glass fibers, as will hereinafter be pointed out. When, on the other hand, the temperature conditions existing will exceed the softening point temperature for the glass composition, then the glass may be incorporated in other forms by attenuation or stretching into a fibrous phase during working or formation of the metal. Under such conditions, the nascent glass fiber surfaces are formed while in combination with the metal to develop the improved bonding relationship.

One method wherein the glass may be included as previously formed fibers with the metal makes use of the concepts of powder metallurgy in which the metallic phase, representing the substantially continuous phase, has a sintering point temperature below the softening point temperature of the glass. While it is possible to make use of a system wherein the metallic phase constitutes the smaller proportion in the system but not less than 20 percent by weight, it is preferred to make use of a system wherein the metallic phase constitutes the major proportion of the final products such as more than 50 percent by weight. In the most desirable applications, use is made of glass fibers in amounts greater than 5 percent by weight up to 80 percent by weight of the final product. On the basis of parts by volume, the materials can be present in the ratio of 5–90 parts by volume glass to 95–10 parts by volume of metal.

In operation, the glass fibers are uniformly distributed by admixture with the metal, while the metal preferably is in the form of a powder. The desired amount of the mixture is then compressed in a mold to the desired form or shape and then heated to a temperature above the sintering temperature of the metal whereby the metal fuses or else functions as a binder to form a composite structure containing the glass fibers as an inclusion therein. Sintering, as the term is employed in the powder metallurgical field for heating sufficiently to cause bonding of the metal particles, may be carried out while the materials are still under compression or after the molded material has been removed from the mold for heat treatment separate and apart therefrom.

Under the conditions existing, the desirable properties of the glass fibers are not materially affected as by disintegration under pressure or by loss of strength, especially when the temperature conditions existing are substantially below the softening temperature for the particular glass of which the fibers are formed, as previously pointed out. If it should be desirable to make use of a temperature lower than the sintering or fusion temperature for the metallic component or if one wishes to make use of a metal having a sintering or fusion temperature which is above the softening point temperature for the glass composition, the powdered metal can be combined by admixture with the powder of another metal or alloy having a sintering or fusion temperature below the softening point temperature for the glass composition for bonding the materials to form a composite product upon compression and heating to the sintering or fusion temperature of the binder metal. The latter will usually be present in amounts greater than 5 percent by weight up to about 25 percent by weight of the metallic compounds, or about 2.5–25 percent by volume.

By way of example, aluminum, magnesium, wood metal, lead, or zinc can be used alone or in combination with inclusions of glass fibers formed of a glass composition having a softening point of 700° F. to above 1500° F., such as glass compositions of Examples 1–13. The metal in powder form is mixed with glass preferably in amounts of about 50–90 parts by weight of the metal to 10–50 parts by weight of the glass fibers. The mixture is molded under pressure ranging from 100 to 10,000 pounds per square inch followed by heat treatment in a furnace to a temperature which may range from 450° F. up to 1250° F., depending upon the metallic component and the composition of the glass fibers.

It will be apparent that the combination may be made to include other metals with glass fibers and that the selection of the metal and glass may be based upon the specification which requires that the metal be capable of sintering to effect the desired bonding relationship at a temperature which is below and preferably substantially below the softening point temperature for the glass composition of which the fibers are formed. Thus a metal capable of being sintered at a temperature as high as 1800° F. may be employed in combination with a glass such as is formed of quartz and the like as long as the temperature employed is also incapable of causing devitrification of the glass whereby its desirable properties as a fiber are destroyed.

Another method wherein structures of the type described may be fabricated by the use of previously formed glass fibers resides in the system wherein the glass fibers are introduced as fibers for admixture with a melt formed of a metal or alloy having a melting point considerably below the softening point temperature for the glass composition of which the fibers are formed. When admixture of the glass fibers with the molten metal is achieved by a mechanical process, such as with a stirrer or mixer, it is preferred to exercise care for minimizing impacting which might cause disintegration or deterioration of the fibers. It is possible by proper control of the materials through methods of admixture to provide for a certain amount of fiber distribution and arrangement in the mix for orientation to develop strengths in a predetermined direction.

The amount of glass fibers that can be incorporated in this manner is usually less than 50 percent by weight of the metal but it is preferred to incorporate an amount of glass fibers greater than 5 percent by weight although even smaller amounts of fiber will provide improvements in the strength properties of the product that is formed.

If the fibers are readily wet out by the metal, distribution of the fibers can be achieved on admixture with a minimum amount of balling, otherwise it is desirable to pretreat the glass fibers as by the application of a size or by modification of the glass fibers by the formation of a film of another glass or metal or metal salt or metal oxide on the surface thereof which is readily wet out by the molten metal. Modification to add a flux or a film of another metal, metal oxide or metal salt onto the glass fiber surfaces in advance of admixture with the molten metal may be achieved by one or more of the processes described in the copending application of Whitehurst, Morrison and Collier, Ser. No. 380,868 filed September 17, 1953, now Patent No. 2,979,424, or as described in the issue patent of Nachtman, No. 2,699,415.

Where a wide differential exists in the specific gravity between the glass fibers and the molten metal or alloy, the tendency for the glass fibers to float to the surfaces of the metal upon admixture can be minimized by making use of glass fibers which have been modified by the application of a coating formed of the same metal or another metal or composition containing a metal, metal oxide or other metallic compounds which are stable and incapable of reduction under the temperature conditions existing. Such modifications will be effective to adjust the specific gravity of the glass fibers toward the specific gravity of the metal or alloy into which it is to be incorporated as an inclusion and which preferably will be selected also to improve the wetting out of the glass fibers with the molten metal.

If the coating on the surfaces of the fibers is the same as that of the melt into which the fibers are included, then the two will blend into a continuous phase in which the coating on the glass fiber surfaces will no longer be apparent. If the coating on the glass fiber surfaces is formed of a material compatible with the metal or capable of forming an intermetallic compound therewith, such intermetallic compound or alloy will tend to form and remain immediately adjacent the glass fiber surfaces with a gradual blending into the metal forming the continuous phase. If, on the other hand, the coating on the glass fiber surfaces is wholly incapable of fusion or incompatible with the metal of the melt, then the coating on the surfaces of the glass fibers will remain as a distinct layer about the glass fiber surfaces in the product that is formed.

The addition of glass fibers or other siliceous fibers to the molten metal has been found beneficially to affect viscosity and the flow characteristics of the metal to the extent that a metal heretofore too liquid for fabrication into molded parts by injection, extrusion, or die-casting, can now be fabricated by such low cost, high speed, fabrication processes for the economical manufacture of products of materials heretofore incapable of such use. Thus more desirable metallic compounds may be employed in the manufacture of parts heretofore manufactured of less desirable metals because of the ability of the latter to be formed by such low cost fabrication processes. In addition to the beneficial improvements in flow and viscosity characteristics, the products containing the glass fibers as inclusions are greatly improved in their strength characteristics with the result that the field of use of various metals can be greatly broadened. In the use of glass and other siliceous fibers to improve the flow and viscosity characteristics for enabling processing of the metal by extrusion, injection, die-casting or the like, it is desirable to make use of a mixture containing a high proportion of metal, for example 60–95 percent by weight of the metal, and to make use of fibers cut to shorter length of less than 4 inches and preferably to the range of within ½ to 2 inches in length in amounts ranging from 5–40 percent by weight, or 5–80 percent by volume glass fibers.

Selection of the metal for use as the melt depends greatly upon the softening point temperature of the glass composition of which the fibers are formed. As previously pointed out, the specification for the selection of materials in the practice of this concept requires that the metal have a melting point temperature or that the metal be capable of being reduced to a fluid consistency at a temperature below the softening point temperature for the glass composition of which the fibers are formed. On the basis of this specification, various combinations of metal and glass may be selected which enables the use of any metal having a melting point up to about 2000° F. for use with a glass having a softening point temperature above the melting point temperature for the metal.

By way of example, fibers formed of a glass composition having a softening point of about 1500° F. and cut to about ½ to 2 inches in length can be added in amounts of about 10–25 percent by weight with stirring to a lead bath or a zinc bath maintained at a temperature of about 850–950° F. The mixture can be cast into molds for setting or the mixture can be extruded, injected or die-cast under pressure to form desirable end products.

Instead of introducing the glass fibers into a melt of the metal or alloy for casting into molds and the like, the glass fibers may be incorporated as an inclusion in a solution of the metal in the form of an amalgam wherein the solvent phase is removed by volatilization at elevated temperatures for solidification of the metal with the glass fiber inclusions as a film or other molded product of desired shape. In a sense, the technique is similar to that which has been used for casting films and molded products from resinous materials in solution as by the removal of a solvent phase. An amalgam containing 20–45 percent by weight metal of a metal such as gold, silver, zinc, lead, bismuth and the like, in solution in mercury or gallium is capable of liquefaction at a temperature within the range of 450–750° F. for casting the desired film or structure. The mercury or gallium can be removed relatively rapidly by volatilization upon heating to a temperature in excess of 850° F. Heating for removal of the solvent phase is carried out preferably in a sealed space provided with recovery equipment for reclaiming the mercury or gallium or other solvent for reuse.

The glass fibers can be incorporated in a system of the type described in amounts ranging from 20–80 percent by volume of the final product or in amounts ranging from one part by weight glass fibers to ¼ to 4 parts by weight of the metal. The glass fibers may be bare or else formed with a coating of the same or another metal, metal oxide, metal salt or other glass on the surface thereof for bonding or for introducing other desirable properties in the final product.

Here a specification for use in making a proper selection of the metal and glass components is not limited by the melting point of the metal or the softening point of the glass except that the latter should have a softening point above the vaporization temperature required for removal of the solvent phase or amalgamating phase. If the temperature for removal is too high for safe use with the glass fibers, then vaporization for removal may be carried out at a lower temperature under subatmospheric conditions, generally referred to in the trade as vacuum distillation. Any metal can be employed as the matrix as long as the metal is soluble in another phase which is volatilizable at a reasonably low temperature and which forms a liquid or fluid phase at a temperature below the softening point temperature for the glass composition.

One of the more important concepts of this invention resides in the system wherein the glass, present as inclusions in the metal, is deformed by extension, drawing or elongation in the metal during working of the metal, as by drawing, extrusion, forging, rolling, casting, die-casting, die-pressing and the like. For such purposes, the glass may be incorporated with metal as a fiber or as particles wherein the glass inclusion is stretched into what resembles fibers by deformation with the metal during working.

Theoretically, it is possible to make use of any glass having a softening point below the temperature at which the metal is worked. From a practical standpoint more is required since glass, at its softening point, is still stiff enough to resist rapid plastic deformation. The lower temperature limit for the glass composition can be more accurately defined as that temperature at which the fibers are softened sufficiently for deformability or extensibility at a rate high enough to prevent disintegration or loss of integrity of the fibers being formed. This temperature is, as has already been indicated generally, above the softening point temperature for the glass composition of which the fibers are formed and usually considerably above the softening temperature especially where the rate of deformation is high. In practice, it has been found that the desired degree of softness for stretching the glass into fibers at a sufficiently rapid rate is available when the glass has a log viscosity measured in poises which is less than 10 at the temperature at which the metal is worked. Thus the specification used for selection of the glass composition and metal should have as its basis a metal which is deformable by working and a glass composition which has a softening point below the temperature at which the metal is worked and which preferably is softened sufficiently to permit plastic deformation at a relatively rapid rate at the temperature at which the metal is worked. In more specific terms, the glass composition of which the fibers are formed should have a softness measurable as a log viscosity in poises below 10 at the temperature of the metal being worked, as indicated in FIGURE 1 of the drawing.

In addition to the limitation as to softness, the glass should not devitrify at or slightly above its softening point temperature and it should be sufficiently durable from the chemical and physical standpoint to resist deterioration under the conditions existing during fabrication or under conditions of use.

It will be apparent that the metal may be worked in a solid state in such processes as drawing, rolling, forging or extrusion when heated to a temperature at which the glass inclusions are softened sufficiently to permit plastic flow or deformation without disintegration at the rate of deformation of the metal, the metal also being plastic at such working temperature.

It is preferred to make use of a glass of which the fibers are formed that is readily wet by the molten metal so as to enable the development of a desirable bonding relationship between the surfaces of the glass and the metal for drawing the glass out into fibers, as the metal is worked. Glasses incapable of being wet sufficiently by the metal can, however, be used if the surfaces of the glass are treated by a flux or modified by a metal, glass, metal oxide or metal salt which is readily wet by the molten material.

Specifically, with aluminum, it is desirable to make use of a glass composition which is not softened at a temperature within the working range of 700–900° F., such as with the glasses of Example 1 or 7. With copper, it is desirable to make use of a glass, such as fused kaolin in Example 8, or fused silica as in Example 9. Similarly, other glasses can be selected for use with a particular metal, whether the metal is to be worked in a fluid state at or above its melting point or in a solid state below its melting point.

In a somewhat related concept, the desired product formed of metal with inclusions of glass which have been stretched out into substantially fibrous form can be prepared by the introduction of glass directly to the metal while the latter is in a molten state. Addition of the glass may be made while in the form of a glass powder or glass fiber, either of which are of sufficiently small dimension to permit rapid heating to the temperature of the melt. In other instances, it is more desirable to incorporate the glass inclusions by addition of the glass in a molten state to the molten metal. If the temperature of the melt is sufficiently hot to reduce the glass to a softness capable of substantially fluid flow with the metal, the glass may be caused to deform into fibers by the process of stirring the mixture of metal and glass, as pointed out in related processes in the parent application previously referred to, followed by pouring or casting the mixture into molds. Instead, deformation into fibers present as inclusions in the metal may be caused to take place as the metal and glass are poured together or advanced together in a substantially continuous stream into molds for setting.

Where the materials, namely the glass and metal, have substantially similar flow characteristics or, where the viscosity of the glass is even higher than the viscosity of the molten metal, the desired extension of the glass inclusions will take place upon extrusion of the metal through a suitable forming die such as in extrusion or upon extrusion of the metal through a suitable orifice into molds, as in the process of die-casting and the like. Because of the flow of the metal lengthwise in a stream through the forming die or nozzle, the glass inclusions will be elongated and will appear as elongated fibers in the product that is formed.

For such purposes as are herein described which depend upon the elongation of the glass inclusions during metal working or metal flow, the dimension of the fibers formed will be found to be dependent somewhat on the size of the original glass particles and the amount of reduction in cross section of the metal by elongation in forging or rolling. The finer the particles, the finer will be the fibers, and vice versa. In general, it will be undesirable to have more than 30 percent by weight glass inclusions in the metal for fiberization but compositions containing as high as 50 percent by weight glass have been found to provide many of the desirable improved characteristics. It is preferred to make use of more than 5 percent by weight glass inclusions in the metal for fiberization but lesser amounts will provide some of the desirable effects. On a volume basis, the amount of glass fibers in the system can range from 5–95 percent by weight.

In the latter concept, the basis for the selection of the glass composition of which the fibers are formed is related more to the melting point temperature of the metal. It is necessary to make use of a glass composition having a softening point considerably below the melting point of the metal. It is preferred to make use of a glass composition which is capable of relatively free plastic flow and almost fluid flow at the melting point temperature of the metal and especially at the temperature at which the metal is to be processed.

In the products which are fabricated in accordance with the practice of this invention, it is desirable to provide for the existence of a strong bonding relationship between the glass fiber surfaces and the metal, especially where use is made of the glass fibers as a reinforcement for strengthening of the metal. In many of the methods of fabrication, as in the process wherein the glass inclusions are deformed with the metal upon working, it is desirable also to provide for rapid wetting of the glass surfaces by the molten metal or the metal to be worked in addition to the development of a strong bonding relationship between the elements in the final product.

There are many factors to be considered in the development of a strong bonding relationship or in the rapid wetting out of the surfaces of the glass. In many instances, the materials naturally wet one another and develop a strong bonding relationship therebetween. In other instances, it may be necessary either to maintain conditions such as a time and temperature relationship or other conditions wherein a good bonding relationship can be established between the materials as in the development of nascent conditions on the glass surfaces or by modification of the surface characteristics of the glass by the addition of a flux or a coating on the glass surfaces such as of a metal, metal oxide, metal salt or another glass which is more receptive to the metal under the conditions existing, or else by modifying the metal system to include elements which cause the desired wetting and bonding relationship to be established through chemical, physical, or electrochemical forces. All of these will hereinafter be pointed out in greater detail. The following discussion related to the wetting and bonding characteristics as between the metal and glass provides further guide posts in the selection of materials and the methods of handling in the practice of the processes heretofore described to the end that the method for carrying out the invention, including the selection of materials and their handling, will be sufficiently described for production of the desired end products.

*Effect of Composition on Adhesion*

It has been found that glasses which contain sodium, potassium, copper, cobalt or titanium are more readily wet by molten metal than other glasses in which such elements are absent and that the bonding relationship between such glasses and the metal in the final product is also of a relatively high order. For example, molten aluminum readily wets glasses of the type represented by the compositions of Examples 2, 3, 4, 5, 6 and 7. It has also been observed that molten aluminum readily wets lead borate glasses, $B_2O_3$ glasses and lead borosilicate glasses, as represented by the glass compositions of Examples 10, 11, 12 and 13.

When it is desired to effect the combination of glass fibers with metal, glasses of a composition can be selected not only on the basis of its softening characteristics and flow characteristics, but also with reference to its composition for wetability by the particular metal to the end that simple admixture of the glass and metal is all that will be required to effect the desired results.

Composition comes into consideration also in effecting adhesion and wetting not only on the basis of certain elements and conditions which increase the reception of the metal to the glass fiber surfaces but by the processes of electrochemical action wherein the metal is capable of displacement of elements in the glass which are above it in the electromotive series.

When the glass contains metal oxides reducible by molten aluminum, such for example as lead oxide or silicon oxide, an oxidation reduction reaction can take place to form aluminum oxide and the corresponding metal at the interface between the molten aluminum and the glass. By maintaining the melt at an appropriate temperature, the aluminum oxide formed at the interface will be able to diffuse into the glass and form a surface coating which is readily wet by the metal. Interdiffusion, as above described, can thereafter occur to give the required adhesion between the molten and the glass fiber surfaces.

Similarly, the presence of compounds of certain metals such as lead, silver, copper, antimony and the like in the glass leads to reduction to their respective metals by electrochemical action with molten metals which stand higher in the electromotive series. Thus, in such cases by reaction to form the metal and the metal oxide in the glass surface, excellent wetting and adhesion to such glasses by the metal can be secured.

These may be the reasons why most glasses containing such elements as sodium, potassium, copper, lead, silver and antimony can be readily wet by most metals.

In some instances, it is highly likely that interaction and interdiffusion between the molten metal and the glass occurs, at least to a limited extent, with some of the glass components actually diffusing into the metal. Such interdiffusion may also involve dissolution between the glass and metal. In the final product, there will be composition gradients about each of the fibers from a metal phase through a diffused phase to a glass phase where such diffusion or interdiffusion reaction occurs. The boundary phase may be considered to comprise two interdispersed gradient compositions, one being glass with metal dispersed or dissolved therein and the other being metal with glass components dispersed or dissolved therein. In the former part of the diffused phase, the metal concentration gradually decreases to zero at the beginning of the glass phase, while in the latter part, the concentration of glass components gradually decreases to about zero at the beginning of the metal phase.

This system can be used to effect a surface treatment for modification of glass to be incorporated with other metals. For example, glass can be admixed with molten aluminum to form the desired interdiffusion for increasing the adhesion of other metals to the glass surfaces merely by providing contact between the glass and the molten metal while the latter is maintained at the desired temperature. In the system wherein the glass contains about 50 percent by weight silicon oxide, about 17 percent by weight calcium oxide, about 15 percent by weight aluminum oxide and small amounts of magnesium oxide, oxide of boron, sodium oxide and iron oxide, it has been found that the above phenomenon occurs at a substantial rate when the metal is maintained at a temperature above 1350° F. Above this temperature, the edges and surfaces of the glass darken to the extent that they become highly reflective as metallic silicon appears to be formed. At the same time the glass becomes easily wetted by the aluminum and a strong bonding relationship is secured. The oxidation reduction type reaction probably proceeds at a temperature lower than 1350° F. but at a relatively slow rate. Where it is feasible to hold an aluminum melt at a lower temperature for an extended period of time, the desired coating can be secured on the glass fiber surfaces upon exposure to the molten aluminum for 5 minutes while at a temperature of 1325° F. or 10 minutes at a temperature of 1310° F. or about 20 minutes at a temperature of about 1295° F. or still longer periods at lower temperatures. It will be apparent, however, that the higher temperatures above 1350° F. which will provide for substantially instantaneous reaction are advantageous because of the greater reactivity of the glass components with the resulting facilitation of interdiffusion.

Stannic and stannous chloride are further examples of materials that can advantageously be used to provide a protective coating to facilitate adhesion between a metal and glass. For example, a receptive coating forms on the glass upon exposure to vapor of stannic chloride. The tin salts appear to react on the hot glass surface to form stannic oxides and hydrogen chloride vapors. The oxide coated glass is readily wet when introduced into a molten metal. With the stronger reducing metals, such as aluminum, magnesium and titanium, there is some interaction to form either tin or the metal oxides or both with resulting good adhesion between glass and metal.

It has also been observed that certain metals alone or in combination with others in an intermetallic compound or alloy enhance the wetting out characteristics and adhesion to the glass surfaces by the metal. For example, magnesium alone readily wets most glasses. It has been found that small amounts of magnesium present in aluminum markedly improves the ability of the aluminum or aluminum alloy to wet the glass and to develop a strong bonding relationship therewith. Similarly, other metals which readily wet the glass can be used as a modifier with metals that do not so readily wet and adhere to glass thereby to improve the wetting characteristics and adhesion between the elements.

*Effect of Presence of Foreign Substances on Adhesion*

Foreign substances, such as metal oxides, present in the molten metal, often interfere with the proper wetting of the glass or adhesion by the metal although the same metal oxide on the surface of the glass may function as an anchoring agent to improve the wetting and adhesion of the glass by the metals.

It has been observed, for example, that a skin of aluminum oxide which usually forms on a bath of molten aluminum interferes with the wetting of glass by the aluminum. It is believed that the aluminum oxide film raises the surface tension of the melt sufficiently to prevent the metal from rapidly wetting the glass. Aluminum oxide, which has a much higher melting point than the metal, is present substantially in the solid state on the surface. The effect of the metal oxide can be overcome by breaking up the film as by penetration with sharp instruments or by continuous agitation.

Instead, the metal oxide present can be reacted with compounds, as represented by the reaction of aluminum oxide with boric acid or lead borate and the like, to form a low melting point borate glass. The low melting lead borate type glass rises to the surface where it remains in a molten state as a protective layer and where it is in a position to coat the glass introduced for inclusion with the metal. Thus a glass coat is formed automatically on the glass inclusions which enhances the wetting and the adhesion of the glass by the metal.

*Effect of Nascent Glass Surfaces on Adhesion*

Because of the hydrophilic character of the glass used in the manufacture of fibers, moisture is preferentially attracted to the glass fiber surfaces to the extent that an adsorbed water layer forms on the glass fiber surfaces almost immediately after the glass fibers have cooled down to about room temperature subsequent to forming. The moisture layer remains strongly bonded to the glass fiber surfaces. Removal can be effected by heating the glass fibers rather drastically to a temperature in excess of 700–750° F. In addition to the moisture layer, gases, and air-borne oily hydrocarbons are believed also to be adsorbed onto the surfaces of the glass.

The adsorbed water film, greases and gases which form naturally on the glass fiber surfaces appear to interfere with the wetting of the glass by the metal and they also interfere with the development of a strong bonding relationship between the metal and glass. This concept is believed to be supported by the observations which have been made to the effect that freshly prepared glass fibers are more rapidly wet and more highly receptive to metals than glass fibers which have been allowed to stand even for a short time in the open atmosphere.

In one aspect, therefore, the invention contemplates the combination of a molten metal with nascent glass surfaces as in such processes wherein a molten metal is combined with glass fibers already formed and wherein the glass inclusions are combined for stretching with the metal during working. In general, bonding to a nascent or fresh surface of glass can be accomplished either by combining the mass of glass fibers with the molten metal immediately after the glass fibers are formed, or by preventing or minimizing the deleterious effect of exposure by maintaining the mass of glass fibers in a heated or inert atmosphere or else by reheating the fibers subsequent to exposure to a temperature sufficient to regain the nascent characteristics of the surface.

It will be apparent that nascent surfaces can also be developed on the glass inclusions during the course of working the metal as by forging, extrusion, rolling, drawing, casting, die-casting or die-pressing, wherein the operation is carried out at a temperature above the softening point temperature for the glass composition and in which the glass is deformed with the resultant exposure of fresh surfaces which are nascent and therefore immediately available for wetting out by the metal.

*Modification of the Glass Fiber Surfaces to Improve Adhesion*

As previously pointed out, when use is made of a glass composition incapable of developing the desired adhesion with a particular metal or incapable of being wet by a particular molten metal, it is desirable to modify the surface characteristics of the glass. The glass can be treated to form another glass as a film on the surface which is more receptive to the metal, as by the formation of a lead borate glass upon contact with such a glass on the surface of molten aluminum or from some other source, as previously indicated. The glass can be treated with a solution of a lead salt such as the chloride, nitrate, acetate or the like, followed by heating to an elevated temperature to form a fused lead salt, oxide or silicate glass on the surface.

Various other surface treatments are possible such as application of a solution of boric acid or boric acid salt which is capable of reaction at elevated temperature to produce a borosilicate glass on the surface. A similar coating of a glass readily wet by aluminum and the like metals can be formed with lead salt and borate to form a lead borosilicate glass as a film on the surface. Similarly, salts of cobalt may be used to form a cobalt glass which is readily wet by molten metal.

The glass may be treated with materials to provide a film on the surface formed of a metal, metal oxide, or a metal salt which is receptive to the metal in which the glass is present as an inclusion. For the various methods which may be employed in the formation of the described anchoring coat on the surface of the glass, reference may be made to the aforementioned copending application of Whitehurst et al. or to the previously referred to Nachtman patent wherein a metallic film of a metallic compound is provided on a glass fiber surface by such processes as immersion of the glass in a bath of metal, metalized vapor deposition, electrochemical plating, electrochemical displacement, thermal reduction, reaction of the metal oxide in a reducing atmosphere, and the like methods. Oxides such as magnesium oxide, aluminum oxide, copper oxide, molybdenum oxide, zinc oxide, silver oxide and tin oxide can be applied by dispersion in a fugitive binder, such as an oil or wax, or as a soluble salt which is convertible to the corresponding oxides during a heat treating step which may be a part of or separate from the heat treating steps for inclusion of the glass with the metal matrix.

For example, molybdic oxide can be formed on the glass surfaces by application of ammonium molybdate followed by thermal decomposition and in like manner. Phosphate coatings may be secured by application of ammonium phosphate. Metal coatings can be secured from metal hydrides or carbonyls which are subject to thermal decomposition, such as nickel from nickel carbonyl, and these coatings in turn may be oxidized in hot air to oxides; for example, nickel oxide.

*Coatings of Metal*

Formation of a barrier to adhesion or wetting out as in a moisture film or adsorption of gases can be minimized by the coating of the glass and glass fibers in forming with a protective film, such as an organo silicon compound or an organic or inorganic anchoring agent which is more preferentially received on the glass fiber surfaces than moisture, such as a Werner complex compound, a silane, polysiloxane or an organo boro compound capable of B—O—Si linkage with glass such as methyl, ethyl, isoamyl, isobutyl, phenyl, tolyl boric acids which decompose at elevated temperatures to release the organic compounds and provide boron for producing borosilicate glass and the like.

It will be apparent from the foregoing that the characteristics of metals, when combined with or reinforced by glass fibers, according to the practice of this invention, can be beneficially altered. For example, most of the metals can be improved from the standpoint of strength to weight ratio, tensile strength, impact strength, flexure strength and inertness by the inclusion of glass in the form of fibers, with or without orientation.

Dimensional stability, and fatigue strength are all substantially improved, especially upon exposure of the particular metal to elevated temperatures. It appears that these improvements might result from the ability of the glass inclusions to limit the elasticity and plasticity of the metal. Aluminum admixed with glass fibers in accordance with the practice of this invention is substantially increased in its strength properties and creep, especially at temperatures in the range of 600–1000° F. Similar increases in the described combination of glass inclusions are secured with lead and with zinc.

Products produced in accordance with the practice of this invention may show greatly improved resistance to corrosion, particularly at elevated temperatures. Expensive metals can, in a sense, be diluted with the glass to decrease the cost of the product without affecting the desirable properties of the metal.

From the standpoint of working or fabrication, the addition of glass inclusions to molten metals so modifies the characteristics of the metal as to enable fabrication by processes not heretofore available, especially where the metals formerly were characterized by very low viscosity at elevated temperature. By increasing the viscosity of the metal at its melting temperature, particularly with respect to the low melting point metals, extrusion, injection or die-casting is available as a forming process wherein the metals can be more easily controlled.

It will be apparent from the foregoing that there is provided a new and improved method for forming inclusions of glass fibers into metal desirably to improve the mechanical and physical properties of the metal in applications in which the metal has been employed and further to improve the physical and mechanical properties of the metal whereby the metal becomes available for use in fields heretofore occupied by other materials.

It will be understood that the glass fibers that are formed by deformation of the glass particles included with the metal during working may not in reality correspond to the fine uniform glass fibers produced by attenuation in the conventional fiber forming processes but the extended glass particles are believed dimensionally and physically to embody glass fiber characteristics to the extent that they function to provide many of the described improvements in addition to the modification of the metal by way of its inertness, flow characteristics and the like.

In the preceding, relative amounts of fiber and metal included in the masses produced have been given in terms of parts or percentages by weight. It will be realized that as the glasses generally are of about a 2.5 specific gravity and that the metals are both lower and much higher than this in specific gravity that the weight percentage figures thus represent a wide range in relative volumes of the two phases. A mix of lead including 60 percent by weight of glass fibers would have therein 90 percent by volume of the glass phase. When calculated on a volumetric basis, it is possible, depending upon the degrees of alignment of the fibrous phase, to include a fibrous glass phase of 75 to 90 percent by volume or only 25 to 10 percent by volume of metal. This maximum possible volume of dispersed or included fibrous glass will also vary as the fibrous glass is of a single diameter or of some multiple distribution of diameters. Thus the invention includes the making of products where the glass may be of up to 90 percent by volume as a maximum and down to 5 percent by volume as a minimum in combination with a metal or metals or metallic compounds as the remainder to produce products of improved strength and utility. It will be understood that the volumetric ratios may be calculated by conversion with the specific gravities of the metals, using 2.5 as the specific gravity for the glass components.

It will be understood that changes may be made in the details of formulation and operation, without departing from the spirit of the invention, especially as defined in the following claim.

I claim:

A method for producing a metal product formed of a substantially continuous phase of the metallic component and a discontinuous phase of the glass fibers wherein the latter are uniformly distributed throughout the continuous metallic phase, comprising the steps of mixing glass particles with a metal in finely divided form having a sintering temperature below the softening point temperature for the glass composition of which the particles are formed and in which the glass fibers are present in an amount greater than 5% by volume but less than 95% by volume of the metallic product, compressing the mixture of materials to the desired shape, heating the compressed mass to a temperature above the sintering temperature of the metal, but below the softening temperature for the glass particles, and thereafter elongating the shape of the mass at a higher temperature at which both glass and metal are plastic and said glass is extended into fibrous form dispersed as a discontinuous phase in the substantially continuous phase of the metal.

References Cited in the file of this patent

UNITED STATES PATENTS

| | | |
|---|---|---|
| 1,556,364 | Smith | Oct. 6, 1925 |
| 1,862,332 | Coffman | June 7, 1932 |
| 2,134,752 | Ehlers | Nov. 1, 1938 |
| 2,264,285 | Bennett | Dec. 2, 1941 |
| 2,271,829 | Powers | Feb. 3, 1942 |
| 2,301,062 | Long | Nov. 3, 1942 |
| 2,311,613 | Slayter | Feb. 16, 1943 |
| 2,415,036 | Quinn | Jan. 28, 1947 |
| 2,447,980 | Hensel | Aug. 24, 1948 |
| 2,450,339 | Hensel | Sept. 28, 1948 |
| 2,559,572 | Stalego | July 3, 1951 |
| 2,577,936 | Waggoner | Dec. 11, 1951 |
| 2,583,855 | Kenis | Jan. 29, 1952 |
| 2,616,165 | Brennan | Nov. 4, 1952 |
| 2,619,438 | Varian | Nov. 25, 1952 |
| 2,628,417 | Peyches | Feb. 17, 1953 |
| 2,681,324 | Hochberg | June 15, 1954 |

(Other references on following page)